Feb. 5, 1924.   
E. SCHIMANEK   
1,482,525   
INDICATOR FOR DETERMINING THE AVERAGE PRESSURE IN THE CYLINDERS OF PISTON MACHINES   
Filed Sept. 3, 1921   
3 Sheets-Sheet 1

Inventor  
Emil Schimanek  
By Langner, Parry, Card & Langner  
Attys

Feb. 5, 1924. 1,482,525
E. SCHIMANEK
INDICATOR FOR DETERMINING THE AVERAGE PRESSURE IN THE
CYLINDERS OF PISTON MACHINES
Filed Sept. 3, 1921  3 Sheets-Sheet 3
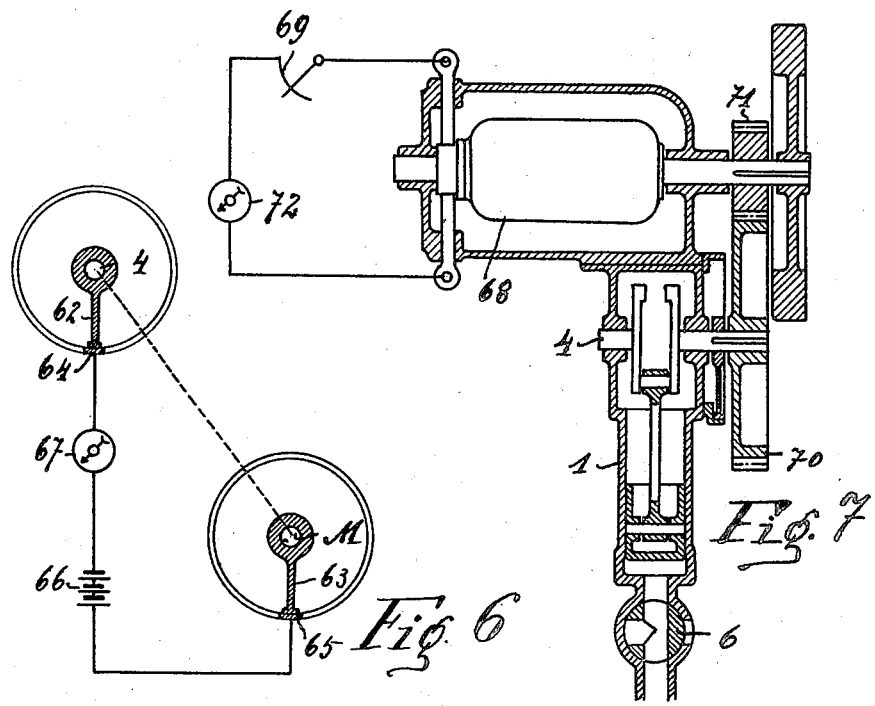
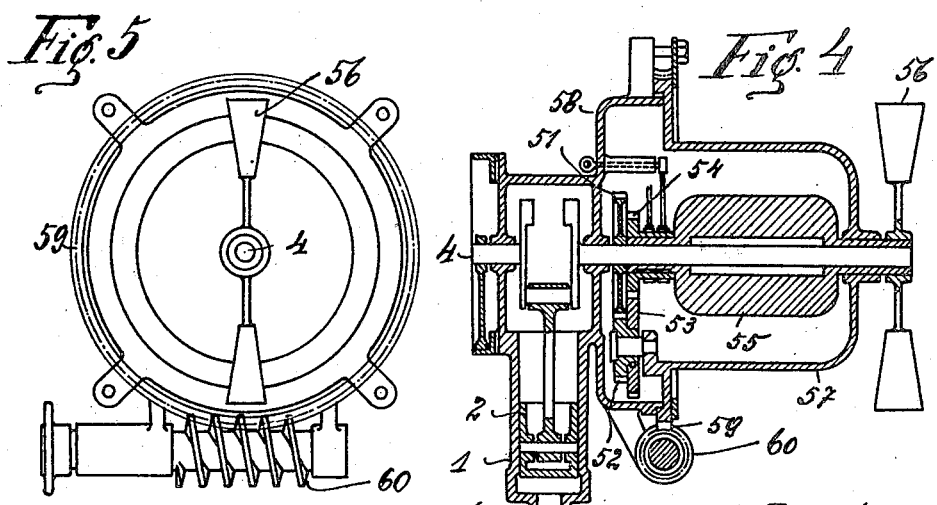
Inventor
Emil Schimanek Patented Feb. 5, 1924.

1,482,525

UNITED STATES PATENT OFFICE.

EMIL SCHIMANEK, OF BUDAPEST, HUNGARY.

INDICATOR FOR DETERMINING THE AVERAGE PRESSURE IN THE CYLINDERS OF PISTON MACHINES.

Application filed September 3, 1921. Serial No. 498,473.

*To all whom it may concern:*

Be it known that I, EMIL SCHIMANEK, a citizen of Hungary, residing at Budapest, in Hungary, have invented certain new and useful Improvements in Indicators for Determining the Average Pressure in the Cylinders of Piston Machines (for which I have filed applications in Hungary, Jan 24, 1917; Hungary, June 20, 1917; Germany, Jan. 31, 1917; and Germany, June 26, 1917), of which the following is a specification.

My invention relates to indicators for piston engines, such as internal combustion engines, steam engines, compressors, and the like.

The primary object of my invention is to provide an indicator which will indicate directly the mean working pressure of a piston engine.

Other objects will be in part obvious and in part pointed out hereinafter.

The invention is illustrated by way of example in the accompanying drawings, in which—

Figs. 4 and 5 show, respectively, in vertical section and in end elevation an example of an electric coupling of the indicator with the piston engine.

Fig. 6 is a diagrammatic view of the phase indicator used in connection with the electric coupling according to Figs. 4 and 5.

Fig. 7 shows the indicator coupled with an electric brake.

Figure 1:
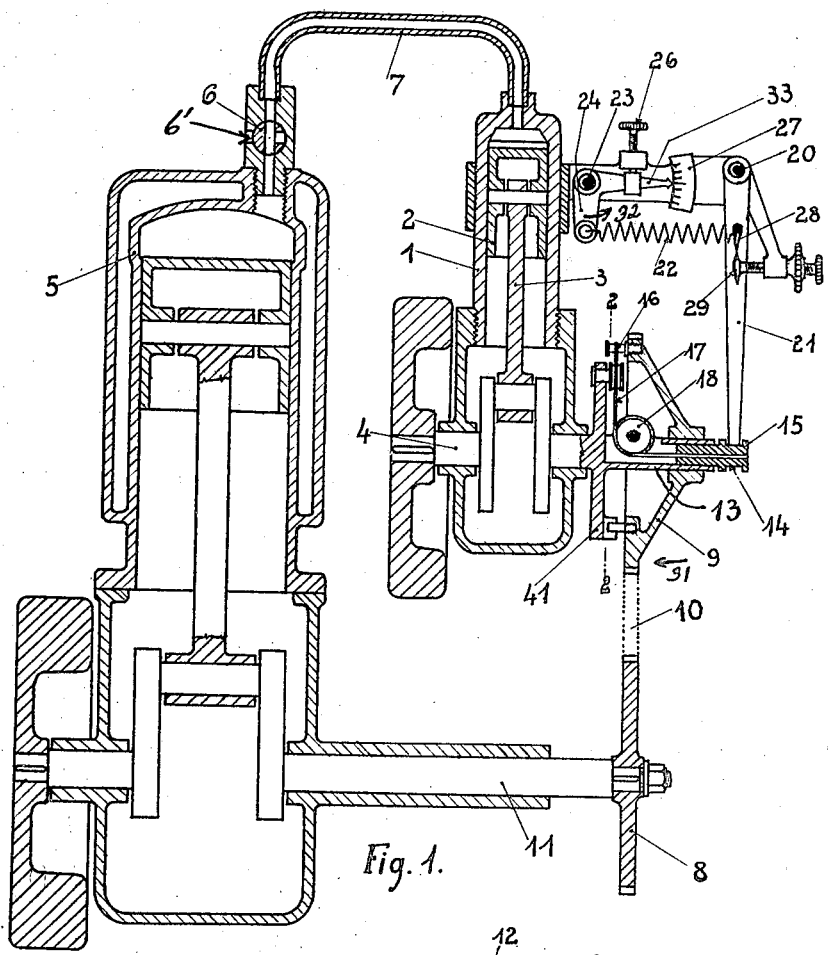
Fig. 1 is a vertical sectional view of an internal combustion engine with an indicator constructed according to my invention applied thereto.

Referring to Fig. 1, the indicator consists essentially of a small piston engine, comprising a cylinder 1, a piston 2 sliding therein, a connecting-rod 3, and a crankshaft 4. A tube 7 connects the cylinder of the indicator with the cylinder 5 of the internal combustion engine to be tested, a three-way valve 6 being provided in the tube whereby to connect the working space of the cylinder 1 either to the working space of the cylinder 5 or with a passage 6' leading to the atmosphere.

Means is provided to secure synchronism and coincidence of phase of the operation of the pistons of the indicator and of the engine to be tested. This means comprises, according to Fig. 1, a toothed wheel 8 mounted on the crank-shaft 11 of the engine to be tested and a toothed disc 9 loosely mounted on the crank-shaft 4 of the indicator and a chain 10 connecting the toothed wheel 8 with the toothed disc 9. Between the member 9, driven in synchronism with the crank-shaft 11 of the motor to be tested, and the crank-shaft 4 of the indicator a suitable dynamometer is inserted whereby to measure the force required to keep the indicator-motor in synchronism with the engine to be tested when the indicator-motor is driven by the working fluid acting within the working cylinder 5. According to Figs. 1 and 2, this dynamometer comprises a string 17 connected at one end to a stud 16 on the disc 9 near its periphery. A loose pulley 18 is mounted adjacent the axis of the member 9 and the string 17 extends radially from the stud 16 and passes around the pulley 18 and then extends axially of the disc 9 within the hollow end 13 of the crankshaft 4 and has its other end secured to a plug 14 slidably mounted in said hollow end. A pulley 12 journalled on the disc 41 integral with the crank-shaft 4 engages the radial section of string 17. A lever 21 pivoted at 20 engages a collar 15 of the plug 14 and is connected by means of a spring 22 to a bell-crank lever 24 pivoted at 23. The lever 24 is adjustable by means of a screw 26 and said lever is provided with a pointer 33 cooperating with a scale 27 to indicate the position of said lever. An adjustable pointer 29 cooperates with a pointer 28 on lever 21 for a purpose which will be pointed out hereinafter.

Figure 2:
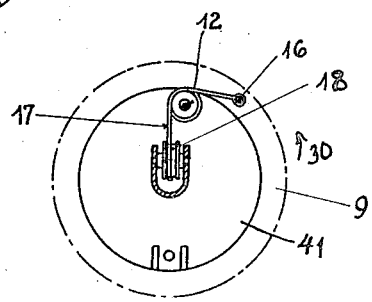
Fig. 2 is a sectional view on the line 2—2 of Fig. 1.

The operation of the indicator disclosed in Figs. 1 and 2 is as follows:—

The device is first adjusted in such manner that when at rest the pointers 28 and 29 are opposite each other. Then the disc 9 is connected by means of the chain 10 and toothed wheel 8 with the engine to be tested in such manner that the piston of the indicator-motor and the piston of the engine to be tested are in the same relative positions in their cylinders. The engine to be tested is now started and, on the one hand, with a suitable adjustment of the three-way valve 6, the working fluid coming through tube 7 from the cylinder 5 exerts pressure upon piston 2 of the indicator and causes crank-shaft 4 and disc 41 to be driven thereby, and, on the other hand, disc 9, positively connected with the engine to be tested, rotates in synchronism with said engine. The indicator-motor, not being loaded, tends to accelerate, whereby disc 41 tends to overtake in the direction of arrow 30, Fig. 2, the disc 9 and by means of pulley 12 and string 17 effects a pulling force in the direction of arrow 31, Fig. 1, on plug 14. This pulling force is taken up through collar 15 and lever 21 by spring 22 which is compressed thereby. Thus the indicator-motor is loaded by spring 22, which load increases up to the point where the pressure of the spring balances the torque of the indicator-motor. The operator now adjusts the bell-crank lever 24, by means of adjusting screw 26, in the direction of the arrow 32 until pointer 28 is again opposite pointer 29. The difference between this position of the lever 24 and its initial position can be read off on the scale 27 with which the pointer 33 cooperates. This difference gives a measure of the force effected by spring 22 or the tension of string 17. This is the force with which disc 9 retards disc 41 and this represents the load of the indicator-motor. From the bore and stroke of the indicator-motor the pressure can be calculated which, operating continuously during the complete stroke of the piston 2, would effect the same mean load as the actual load. This pressure is the useful mean pressure of the indicator-motor. Adding to this the no-load pressure of the indicator gives the indicated mean pressure.

The no-load pressure of the indicator can be determined independently of the engine to be tested the cock 6 being positioned to connect indicator piston to atmosphere. There are different methods for doing this. For example, pointer 29 may be adjusted to register with pointer 28, taking care that string 17 is loose and spring 22 is not compressed. Then disc 9 may be rotated by any suitable means with the same number of revolutions per minute as the engine to be tested. The direction of the torque must be the same as when indicating, i. e., opposite to arrow 30, Fig. 2. Disc 9 drives disc 41 through string 17 and rotates the indicator-motor. The tension of string 17 moves lever 21 in the direction of arrow 31 and compresses spring 22 thereby. Adjusting, by means of screw 26, the bell-crank lever 24 in the direction of arrow 32 until pointers 28 and 29 are again opposite each other, the difference between this and the initial position of the pointer 33 can be read on the scale 27. This difference stands in the same relation to the no-load pressure as the difference read off when indicating stands to the useful mean pressure. The sum of the useful mean pressure and the no-load pressure gives the indicated mean pressure, which is equal to the indicated mean pressure of the engine being tested. The no-load pressures at different numbers of revolutions can be determined once and for all and compiled in a table which may be furnished with every indicator. It is then unnecessary to determine the no-load pressure in every case.

Figure 3:
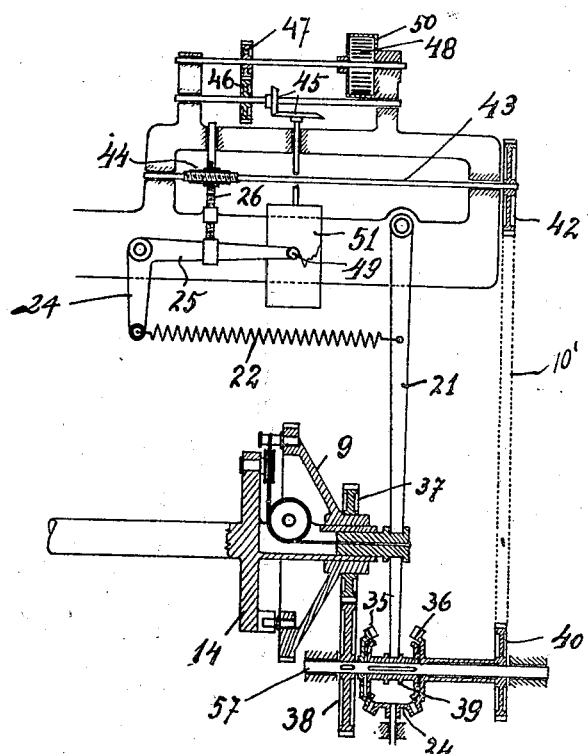
Fig. 3 shows the connection of an indicator constructed according to Fig. 1 with an automatic registering device.

The distortion of the spring, which is proportional to the useful mean pressure of the indicator, can be continuously recorded, for example, by means of the device shown in Fig. 3. For this purpose the adjusting screw 26 is positively connected with disc 9 in such manner that the shifting of lever 21 causes screw 26 to revolve in the sense that by a suitable turning of lever 24 the lever 21 will be returned to its original position. As shown, this is effected by means of bevel gears 35 and 36 loosely mounted on shaft 57 and engaging with bevel gear 34. Shaft 57 is driven by disc 9 through the intermediary of gear wheels 37 and 38. Shaft 57 is provided also with the double-acting friction-clutch 39 longitudinally movable on shaft 57, and which engages either with gear 35 or with gear 36 at very slight movements of the lever 21. The toothed wheel 40 fixed to the hub of gear 36 rotates the adjusting shaft 43 through chain 10' and toothed wheel 42. Adjusting screw 43 actuates adjusting screw 26 by means of worm-gear 44. Lever arm 25 of bell-crank lever 24, which carries pencil 49, draws the positions of arm 25 corresponding to the force of the spring 22 on drum 51 which latter is given a movement proportional with time by means of clockwork 48, 50 and gearing 47, 46, 45. So long as lever 21 is at rest, no movement is imparted to either gear 36 or adjusting shaft 43. As soon as the effective torque of the indicator increases or decreases and arm 21 moves to the right or left accordingly, clutch 39 engages with one of the gears 35 or 36 whereby gearing 40, 44 rotates adjusting screw 26 in one direction or the other. The effect of the rotation is to alter the tension of spring 22 in such manner that arm 21 tends to occupy its position of rest. As soon as this is the case, clutch 39 disengages gear 35 or gear 36 and the registering pencil remains stationary.

Of course the registering device can be differently constructed without affecting the substance of the invention. In the embodiment of the invention described above, the yielding coupling, acting with variable force, is a mechanical coupling. There may be, however, conditions such that there is no room for an adjustable mechanical coupling and where it would be advantageous to effect coupling between the indicator-motor and the engine to be tested by electrical means. The invention contemplates, therefore, a very simple and handy arrangement of such an electrical coupling in which the indicator-motor is rotated by a motor supplied with alternating current from a generator driven by the engine being tested, a phase indicator being provided for showing when the phase of the indicator-motor coincides with that of the engine being tested, the indicator-motor being loaded by a continuous constant load greater than its highest power capacity, and its angular position relative to that of the driving shaft of the engine being tested being variable.

An example of an electrical coupling as described in the preceding paragraph is disclosed in Figs. 4, 5 and 6. In this construction, crank-shaft 4 of the indicator-motor carries the rotor 55 of an electrical synchronous motor loosely mounted on it by means of a hollow shaft. The drive from crank-shaft 4 is effected by means of gearing 51, 52, 53, 54. The hollow shaft of the rotor 55 is provided with fan 56 or is loaded by some other means which remains constant at synchronous speeds and which load is greater than the maximum power which the indicator-motor is capable of delivering under usual test conditions. The housing of the electro-motor is made in two parts 57, 58, of which part 57 is capable of an angular displacement relative to part 58 by means of gear 59 and worm 60. Gear wheels 52, 53 are journalled on rotatable part 57. The shaft of the engine being tested drives directly or indirectly an alternating current generator by which the electro-motor is fed.

The phase indicator shown in Fig. 6 comprises the contact arm 62 fastened to shaft 4 of the indicator-motor and contact arm 63 fastened to shaft M of the engine being tested, said contact arms having the same angular relation to corresponding phase positions of the engine and indicator. These contact arms are rotated over the fixed contact segments 64 and 65, respectively, which are arranged in positions corresponding to the same phase. Both rotating contact arms 62, 63 and fixed contact segments 64, 65, together with battery 66 and current indicator 67 are connected in a circuit. The current indicator 67 acts only when both contacts, 62, 64 and 63, 65 are made simultaneously. This is the case only when both contact arms 62, 63 and consequently the indicator-motor and the engine being tested are operated in synchronism and in the same phase. Obviously any other system of phase indicator may be used instead of the one described.

The operation of the mechanism above described is as follows:—

When the cylinder of the indicator-motor is connected with the atmosphere by means of the three-way valve 6, the electro-motor carries the whole load resulting from its own loss and the driving resistance of the indicator-motor and has to overcome the load 56. The output will be measured by means of a wattmeter inserted into the circuit of the electro-motor. If afterwards the cylinder of the indicator-motor is connected by means of the three-way valve with the cylinder of the engine to be tested, the indicator-motor will supply part of the energy previously delivered by the electro-motor alone. Consequently, the current demand of the electro-motor, the load 56 remaining the same, will be less by that amount.

The difference of phase between the indicator-motor and the engine being tested can be eliminated by adjusting housing part 57 by means of worm gear 59, 60, i. e., by altering, by means of gear wheels 52, 53, the angular position of the crank-shaft of the indicator relative to the shaft of the engine being tested until the phase indicator shown in Fig. 6 indicates the disappearance of phase difference between the indicator-motor and the engine being tested. After this state of affairs has been attained, another reading of the power delivered by the electro-motor, on the wattmeter, must be taken. The difference of the two readings on the wattmeter gives a measure of the useful power of the indicator-motor by the aid of which the mean pressure of the engine being tested can be determined in the manner described above.

The coupling between the indicator motor and the engine to be tested can be dispensed with, if necessary, by furnishing the indicator-motor, provided with a phase indicator, with an adjustable power brake showing the braking force, by the aid of which brake the indicator-motor actuated by the working fluid of the engine being tested can be braked until the phase difference disappears. In this arrangement a phase indicating device similar to that shown in Fig. 6 can be used.

Fig. 7 shows an embodiment of the arrangement described in the preceding paragraph. The indicator-motor drives through gearing 70, 71 the generator 68, the circuit of which contains an adjustable resistance 69 and a load measuring instrument 72. In order to determine the mean pressure of the engine to be tested, the indicator must be connected by means of the three-way valve 6, with the cylinder space of the engine to be tested. Thereafter the indicator-motor will be loaded by means of adjustable resistance 69 until coincidence of phase takes place which is indicated by the phase indicator. The mean pressure can be calculated from the load read off on the wattmeter minus the no-load reading. To determine the no-load power it is necessary to feed the generator 68 from valve 6 by connecting the cylinder of the indicator motor with the cylinder of the engine to be tested. The power observed can be read off on the wattmeter.

Having now described my invention in various of its possible embodiments, what I claim and desire to secure by Letters Patent is:

1. An indicator for determining the mean effective pressure of the working cylinder of a piston engine, comprising a valveless indicator-motor, means to connect the cylinder-space of the said indicator-motor with the cylinder-space of the engine to be tested, means causing the indicator-motor to run in synchronism and phase coincidence with the engine to be tested and means to measure the force necessary to keep the indicator-motor in synchronism with the engine to be tested when connected with the cylinder of the latter.

2. An indicator for determining the mean effective pressure of the working cylinder of a piston engine, comprising a valveless indicator-motor, means to connect the cylinder-space of the said indicator motor either with the cylinder-space of the engine to be tested or with the atmosphere, means causing the indicator-motor to run in synchronism and phase coincidence with the engine to be tested and means to measure the force necessary to keep the indicator-motor in synchronism with the engine to be tested when connected with the cylinder of the latter.

3. An indicator for determining the mean effective pressure of the working cylinder of a piston engine, comprising a valveless indicator-motor, means to connect the cylinder-space of the said indicator-motor with the cylinder-space of the engine to be tested, means for coupling the crank-shaft of the indicator-motor with the machine to be tested, said coupling means being adapted to establish phase coincidence of the indicator-motor with the engine to be tested and means to measure the force necessary to keep the indicator-motor in synchronism with the engine to be tested when connected with the cylinder of the latter.

4. An indicator for determining the mean effective pressure of the working cylinder of a piston engine, comprising a valveless indicator-motor, means to connect the cylinder-space of the said indicator-motor either with the cylinder-space of the engine to be tested or with the atmosphere, means for coupling the crank-shaft of the indicator-motor with the machine to be tested, said coupling means being adapted to establish phase coincidence of the indicator-motor with the engine to be tested and means to measure the force necessary to keep the indicator-motor in synchronism with the engine to be tested when connected with the cylinder of the latter.

5. An indicator for determining the mean effective pressure of the working cylinder of a piston engine, comprising a valveless indicator-motor, means to connect the cylinder-space of the said indicator-motor either with the cylinder-space of the engine to be tested or with the atmosphere, means for coupling the crank-shaft of the indicator-motor with the machine to be tested, said coupling means being adapted to establish phase coincidence of the indicator-motor with the engine to be tested, means to measure the friction losses of the indicator motor when connected with the atmosphere said last means measuring the force necessary to keep the indicator-motor in synchronism with the engine to be tested when connected with the cylinder of the latter.

In testimony whereof I affix my signature in presence of two witnesses.

EMIL SCHIMANEK.

Witnesses:
 Dr. James Sutair,
 Charles Konsey.